US010087800B2

(12) United States Patent
Fukami et al.

(10) Patent No.: US 10,087,800 B2
(45) Date of Patent: Oct. 2, 2018

(54) ENGINE EXHAUST APPARATUS

(71) Applicant: Nissan Motor Co., Ltd., Yokohama-shi, Kanagawa (JP)

(72) Inventors: Toru Fukami, Kanagawa (JP); Satoshi Ogihara, Kanagawa (JP); Yasukimi Toda, Kanagawa (JP); Hiroyuki Nagai, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/300,721

(22) PCT Filed: Mar. 10, 2015

(86) PCT No.: PCT/JP2015/056928
§ 371 (c)(1),
(2) Date: Sep. 29, 2016

(87) PCT Pub. No.: WO2015/151736
PCT Pub. Date: Oct. 8, 2015

(65) Prior Publication Data
US 2017/0122161 A1 May 4, 2017

(30) Foreign Application Priority Data
Apr. 4, 2014 (JP) .................................. 2014-078162

(51) Int. Cl.
*F01N 3/02* (2006.01)
*F01N 3/04* (2006.01)
(Continued)

(52) U.S. Cl.
CPC ........... *F01N 3/043* (2013.01); *F01N 3/0205* (2013.01); *F01N 3/101* (2013.01); *F01N 3/28* (2013.01);
(Continued)

(58) Field of Classification Search
CPC ...... F01N 3/043; F01N 3/0205; F01N 3/2803; F01N 3/046; F01N 3/10–3/108;
(Continued)

(56) References Cited

U.S. PATENT DOCUMENTS 5,753,188 A * 5/1998 Shimoda ............ B01D 53/9454
422/108
5,916,133 A * 6/1999 Buhrmaster ......... B01D 53/944
60/297

(Continued)

FOREIGN PATENT DOCUMENTS

EP    1 286 026 A1    2/2003
JP    2006-250524 A   9/2006
(Continued)

*Primary Examiner* — Mark Laurenzi
*Assistant Examiner* — Mickey France
(74) *Attorney, Agent, or Firm* — Global IP Counselors, LLP

(57) ABSTRACT

An engine exhaust apparatus includes an exhaust passage for flowing exhaust gas emitted from an engine, a flow rectifier for rectifying the flow of the exhaust gas, and an exhaust heat recovery unit disposed in the exhaust passage downstream of the flow rectifier. The exhaust heat recovery unit is provided with an exhaust heat recovery portion and a cooling portion to cool the exhaust heat recovery portion. The engine exhaust apparatus further includes a first diameter reducing portion gradually reduced in diameter toward the exhaust heat recovery unit from the flow rectifier, and a second diameter reducing portion gradually reduced in diameter toward the downstream from the exhaust heat recovery unit.

18 Claims, 6 Drawing Sheets

(51) Int. Cl.
*F01N 3/28* (2006.01)
*F01N 5/02* (2006.01)
*F01N 13/00* (2010.01)
*F01N 3/10* (2006.01)

(52) U.S. Cl.
CPC ............ *F01N 3/2803* (2013.01); *F01N 5/02* (2013.01); *F01N 13/009* (2014.06); *F01N 2240/02* (2013.01); *F01N 2240/20* (2013.01); *F01N 2330/06* (2013.01); *F01N 2330/30* (2013.01); *F01N 2330/34* (2013.01); *F01N 2470/00* (2013.01); *Y02T 10/16* (2013.01); *Y02T 10/22* (2013.01)

(58) Field of Classification Search
CPC ........ F01N 3/28; F01N 3/2882; F01N 3/2889; F01N 3/2892; F01N 3/2885; F01N 2330/34; F01N 5/02; F01N 2240/00; F01N 2240/10; F01N 2240/02; F01N 2230/04; F01N 2260/02; F01N 2260/022; F01N 2260/024; F01M 5/001; F02G 5/02; F01K 23/10; F01P 2060/16
USPC ......... 60/286, 298, 299, 320, 321, 616, 618; 237/12.3 R; 123/142.5 R
See application file for complete search history.

(56) References Cited

U.S. PATENT DOCUMENTS

| | | | |
|---|---|---|---|
| 5,966,929 A * | 10/1999 | Socha, Jr. | B01D 53/944 422/177 |
| 2003/0033801 A1 | 2/2003 | Hinder et al. | |
| 2007/0207070 A1* | 9/2007 | Zuberi | B01D 46/2429 422/180 |
| 2008/0095682 A1* | 4/2008 | Kharas | B01D 53/9418 423/239.1 |
| 2010/0043413 A1 | 2/2010 | Orihashi et al. | |
| 2010/0143211 A1* | 6/2010 | Olivier | F01N 3/2803 422/179 |
| 2011/0220729 A1* | 9/2011 | Bucknell | F01N 5/02 237/12.3 R |
| 2012/0102927 A1* | 5/2012 | Hirota | F01N 3/208 60/287 |
| 2012/0204536 A1 | 8/2012 | Gonze et al. | |
| 2012/0255278 A1* | 10/2012 | Miao | B01F 5/0611 60/274 |

FOREIGN PATENT DOCUMENTS

| | | |
|---|---|---|
| JP | 2011-169514 A | 9/2011 |
| JP | 2013-212493 A | 10/2013 |
| JP | 2015-165095 A | 9/2015 |
| WO | 2013/187285 A1 | 12/2013 |

\* cited by examiner

ENGINE EXHAUST APPARATUS

CROSS-REFERENCE TO RELATED APPLICATIONS

This application is a U.S. National stage application of International Application No. PCT/JP2015/056928, filed Mar. 10, 2015, which claims priority to Japanese Patent Application No. 2014-078162, filed on Apr. 4, 2014. The entire disclosure of Japanese Patent Application No. 2014-078162 is hereby incorporated herein by reference.

BACKGROUND

Field of the Invention

The present invention relates to an exhaust apparatus for an engine.

Background Information

In the JP2011-169514A, an exhaust apparatus is disclosed which is provided with an exhaust passage for flowing exhaust gas emitted from an engine, a catalyst located in an exhaust passage, and an exhaust heat recovery unit in the exhaust passage downstream of the catalyst. The heat recovered in such an exhaust heat recovery unit provided in the exhaust apparatus is used to warm-up of the engine, air-conditioning, and the like.

SUMMARY

In the exhaust apparatus of the engine described above, the upstream side of the exhaust passage of the exhaust heat recovery unit is configured to increase in diameter toward the exhaust heat recovery unit. In such a configuration, the exhaust gas that has passed through the catalyst does not uniformly flow into the exhaust heat recovery unit, but rather flows unevenly and concentrated in a central portion of the exhaust heat recovery unit. As a result, it is not possible to utilize the entire exhaust heat recovery unit so that a problem arises in that the recovery efficiency of the exhaust heat by the exhaust heat recovery unit deteriorates.

The present invention has been made in view of the above problem and aims to provide an exhaust apparatus for an engine capable of enhancing the exhaust heat recovery efficiency by the exhaust heat recovery unit.

According to one aspect of the present invention, an exhaust apparatus for an engine includes an exhaust passage for flowing exhaust gas emitted from the engine, a flow rectifier having a rectifying portion for rectifying the flow of exhaust gas in the exhaust passage, and an exhaust heat recovery unit disposed in the exhaust passage downstream of the flow rectifier and provided with an exhaust heat recovery portion for recovering exhaust heat and a cooling portion for cooling the exhaust heat recovery portion from the outer peripheral side thereof through cooling fluid. The exhaust passage includes a first radially contracting or diameter reducing portion which is gradually reduced in diameter toward the exhaust heat recovery unit from the flow rectifier, and a second radially contracting, or diameter reducing portion which is gradually reduced in diameter toward the downstream of the exhaust heat recovery unit.

DETAILED DESCRIPTION OF THE EMBODIMENTS

Hereinafter, with reference to the accompanying drawings, embodiments of the present invention will be described.

First Embodiment

Figure 1:
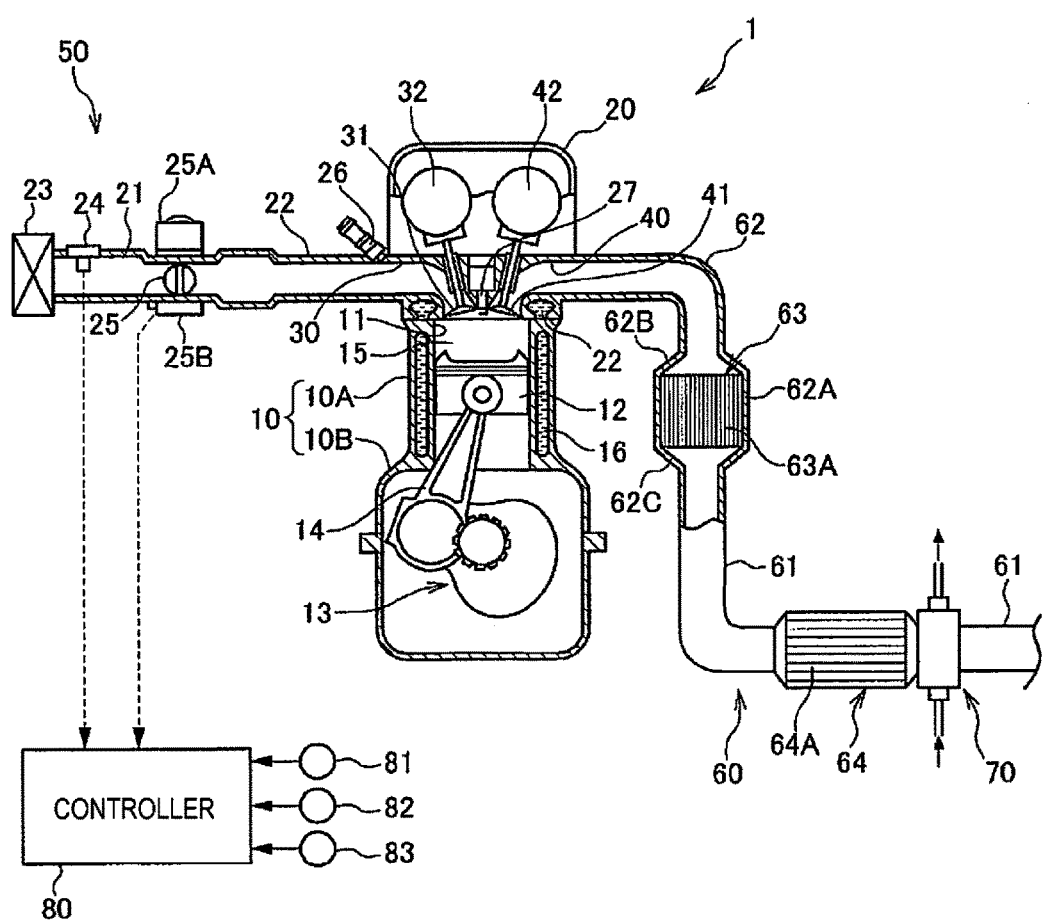
FIG. 1 is a schematic configuration diagram of an engine provided with an exhaust device according to a first embodiment.

FIG. 1 is a schematic configuration diagram of an engine 1 provided with an exhaust device 60 according to the first embodiment.

The engine 1 shown in FIG. 1 is an in-line, four-cylinder internal combustion engine mounted on a vehicle, for example. The engine 1 includes a cylinder block 10, a cylinder head 20 fixed to an upper portion of the cylinder block 10.

The cylinder block 10 is comprised of a cylinder portion 10A, and a crank case 10B formed in the lower portion of the cylinder portion 10A.

In the cylinder portion 10A, four cylinders 11 are formed. Within the cylinder 11, a piston 12 is disposed slidably. The piston 12 receives combustion pressure during air-fuel mixture combustion and reciprocates along the cylinder 11.

The crank case 10B supports a single crank shaft 13 rotatably. Each piston 12 is connected to a connecting rod 14. The lower end of each connecting rod 14 is connected to the crank shaft 13. Reciprocating motion of the piston 12 is converted into rotary motion through the connecting rod 14 and crankshaft 13.

The cylinder head 20 is attached to the upper surface of the cylinder block 10. The lower surface of the cylinder head 20, the side surface of the cylinder 11, and the crown surface of the piston 12 jointly forms a combustion chamber 15.

Further, the cylinder head 20 is formed with an intake port 30 and an exhaust port 40 communicating with a combustion chamber 15. For one combustion chamber 15, two intake ports 30 and two exhaust ports 40 are provided.

The intake port 30 is provided with an intake valve 31. The intake valve 31 is driven by a swing cam of a variable valve mechanism 32 to open and close the intake port 30 in response to vertical movement of the piston 12. The variable valve mechanism 32 is capable of changing a valve characteristic such as a lift amount, operating angle, and the like of the intake valve 31. Also, the exhaust port 40 is provided with an exhaust valve 41. The exhaust valve 41 is driven by a swing cam of the variable valve mechanism 42 to open and close the exhaust port 40 in response to vertical movement of the piston 12. The variable valve mechanism 42 is also capable of changing a valve characteristic such as a lift amount, operating angle, and the like of exhaust valve 41.

An ignition plug 27 is installed in the cylinder head 20 between the intake port 30 and exhaust port 40. One spark plug 27 is provided for each combustion chamber 15 of the engine 1. The spark plug 27 ignites the air-fuel mixture in the combustion chamber 15 at a predetermined timing.

In the cylinder portion 10A of the cylinder block and in the cylinder head 20, water jackets 16 and 22 are provided, respectively. The water jackets 16 and 22 function as a passage for circulation of cooling water (cooling fluid) for cooling around the cylinder 11 and the combustion chamber 15.

The engine 1 further includes an intake device 50 for guiding the intake air (fresh air) into the engine 1, an exhaust device 60 for guiding the exhaust gas from the engine 1 to the outside.

The intake system 50 includes an intake pipe 21, an intake manifold 22, an air cleaner 23, an airflow meter 24, a throttle valve 25 of the electronically controlled type, and a fuel injection valve 26.

The intake pipe 21 is a passage for flowing intake air. The intake manifold 22 communicates with the intake pipe 21 and the intake port 30. The intake manifold 22 distributes the intake air to each cylinder of the engine 1. The intake pipe 21 and the intake manifold 22 function as an intake passage for guiding the intake air to the engine 1.

An air cleaner 23 is provided at the upstream end of the intake pipe 21. The air cleaner 23 is intended to remove foreign matter such as dust and dirt from the air taken in from the outside.

An air flow meter 24 is installed in the intake pipe 21 downstream of the air cleaner 23. The air flow meter 24 detects the amount of intake air flowing through the intake pipe 21, and outputs a detection signal to the controller 80.

In the intake pipe 21 downstream of the air flow meter 24, the throttle valve 25 is provided. The throttle valve 25 adjusts the amount of intake air introduced into the combustion chamber 15 by changing the passage cross-sectional area of the intake pipe 21 continuously or stepwise. The throttle valve 25 is driven to be opened and closed by a throttle actuator 25A. Opening of the throttle valve 25 is detected by a throttle sensor 25B.

In the intake manifold 22, a fuel injector 26 is provided for each cylinder of the engine 1. In other words, each branch pipe of the intake manifold 22 is mounted with a fuel injector 26. The fuel injection valve 26 is intended to inject into the intake manifold 22 the amount of fuel in accordance with the operating state of the engine at a predetermined timing. The fuel supplied to the fuel injection valve 26 is stored in a fuel tank (not shown).

The exhaust apparatus 60 of the engine 1 is an apparatus for purifying exhaust gas from the engine and deriving to the outside. The exhaust apparatus 60 includes an exhaust pipe 61, an exhaust manifold 62, a manifold catalytic converter 63, an underfloor catalytic converter 64, and an exhaust heat recovery unit 70.

The upstream end of the exhaust manifold 62 is connected to the cylinder head 20, while the downstream end of the exhaust manifold 62 is connected to the exhaust pipe 61. The exhaust manifold 62 is intended to collect exhaust from each of the exhaust ports 40 for guiding to the exhaust pipe 61. The exhaust manifold 62 and the exhaust pipe 61 serves as an exhaust passage for guiding exhaust gas from the engine 1 to the outside.

A confluence or junction pipe 62A of the exhaust manifold 62 is provided with the manifold catalytic converter 63. The manifold catalytic converter 63 includes an exhaust gas purification unit 63A to purify the exhaust. The exhaust gas purification unit 63A is constructed as a grid-like carrier, i.e., as a cylindrical member having a plurality of through-holes or rectifying holes capable of passing exhaust gas. The exhaust gas purification unit 63A may be configured as a honeycomb structure having the through-hole shaped in a hexagonal cross-section. The cross-sectional shape of the through-hole of the exhaust gas purification unit 63A is not limited to square or hexagonal, and may be formed in other shapes, such as circular, triangular, etc.

On the surface of the exhaust gas purification unit 63A, a three-way catalyst for purifying exhaust is supported. The exhaust gas purification unit 63A purifies harmful substances such as carbon monoxide, hydrocarbons and nitrogen oxides contained in the exhaust gas which pass through the through-holes by the three-way catalyst. The through-holes of the exhaust gas purification unit 63A also function to rectify the flow of exhaust gas in a fixed direction (passage extending direction). Thus, the manifold catalytic converter 63 is configured as a flow rectifier having an exhaust gas purification unit 63A (rectifying portion) to adjust the flow of exhaust.

The junction pipe 62A on the upstream side of the exhaust gas purification unit 63A is formed as a radially expanding or diameter increasing portion 62B whose diameter increases toward the exhaust gas purification unit 63A. The junction pipe 62A on the downstream side of the exhaust gas purification unit 63A is formed as a radially contracting or diameter reducing portion 62C whose diameter is reduced toward the downstream from the exhaust purification unit 63A. By thus constituting the junction pipe 62A, an increase in the exhaust resistance can be suppressed even with the exhaust gas purification unit 63A arranged in the junction pipe 62A.

The downstream end of the junction pipe 62A of the exhaust manifold 62 is connected to the exhaust pipe 61. The exhaust pipe 61 is a passage for guiding the exhaust gas that has passed through the exhaust manifold 62 to the outside. The exhaust pipe 61 is connected to the underfloor catalytic converter 64 and the exhaust heat recovery unit 70 disposed in this order from the upstream side.

Figure 2:
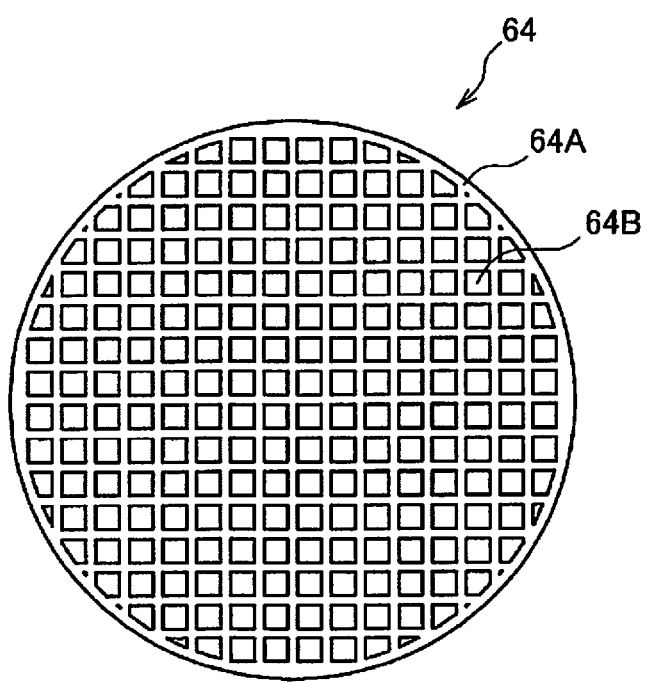
FIG. 2 is a front view of an exhaust gas purification unit of an underfloor catalytic converter.

The underfloor catalytic converter 64 includes an exhaust gas purification portion 64A to purify the exhaust. The exhaust gas purification portion 64A is constructed as a grid-like carrier as shown in FIG. 2, i.e., as a cylindrical member having a plurality of through-holes 64B capable of passing exhaust gas. The exhaust gas purification portion 64A may be configured as a honeycomb structure having the through-hole 64B shaped in a hexagonal cross-section. Note that the cross-sectional shape of the through-hole 64B is not limited to square or hexagonal, and may be formed in other shapes, such as circular, triangular, etc.

On the surface of the exhaust gas purification portion 64A, a three-way catalyst for purifying exhaust is supported. The exhaust gas purification portion 64A purifies harmful substances such as carbon monoxide, hydrocarbons and nitrogen oxides contained in the exhaust gas which pass through the through-holes 64B by the three-way catalyst. The through-holes 64B of the exhaust gas purification portion 64A also function to rectify the flow of exhaust gas in a fixed direction (passage extending direction). Thus, the underfloor catalytic converter 64 is configured as a flow rectifier having an exhaust gas purification portion 64A (rectifying portion) to adjust the flow of exhaust.

As shown in FIG. 1, the exhaust heat recovery unit 70 is provided adjacent to and downstream of the underfloor catalytic converter 64. The exhaust heat recovery unit 70 is a device for recovering exhaust heat that has passed through the exhaust gas purifying portion 64A of the underfloor catalytic converter 64. Heat recovered by the exhaust heat recovery unit 70 is used for warming up of the engine 1 or air-conditioning.

The exhaust gas discharged from the engine 1 to the exhaust apparatus 60 is purified by the manifold catalytic converter 63 and the underfloor catalytic converter 64, and is guided to the outside through the exhaust pipe 61 after the heat has been recovered by the exhaust heat recovery unit 70.

The engine 1 described above is controlled by the controller 80. The controller 80 is constituted by a microcomputer including a central processing unit (CPU), a read-only memory (ROM), a random access memory (RAM), and input and output interface (I/O interface).

The controller 80 receives detection signals from various sensors for detecting operating conditions of the engine such as a temperature sensor 81, an engine rotation speed sensor 82, an accelerator pedal sensor, etc., in addition to detection signals from the air flow meter 24 and the throttle sensor 25B. The temperature sensor 81 detects a temperature of cooling water flowing through the water jacket 16. The engine rotation speed sensor 82 detects the engine rotation speed based on the crank angle. The accelerator pedal sensor 83 detects a depression amount of the accelerator pedal.

The controller 80 optimally controls a throttle opening, a fuel injection quantity, an ignition timing and the like, based on the detected operating conditions of the engine 1.

Figure 3:
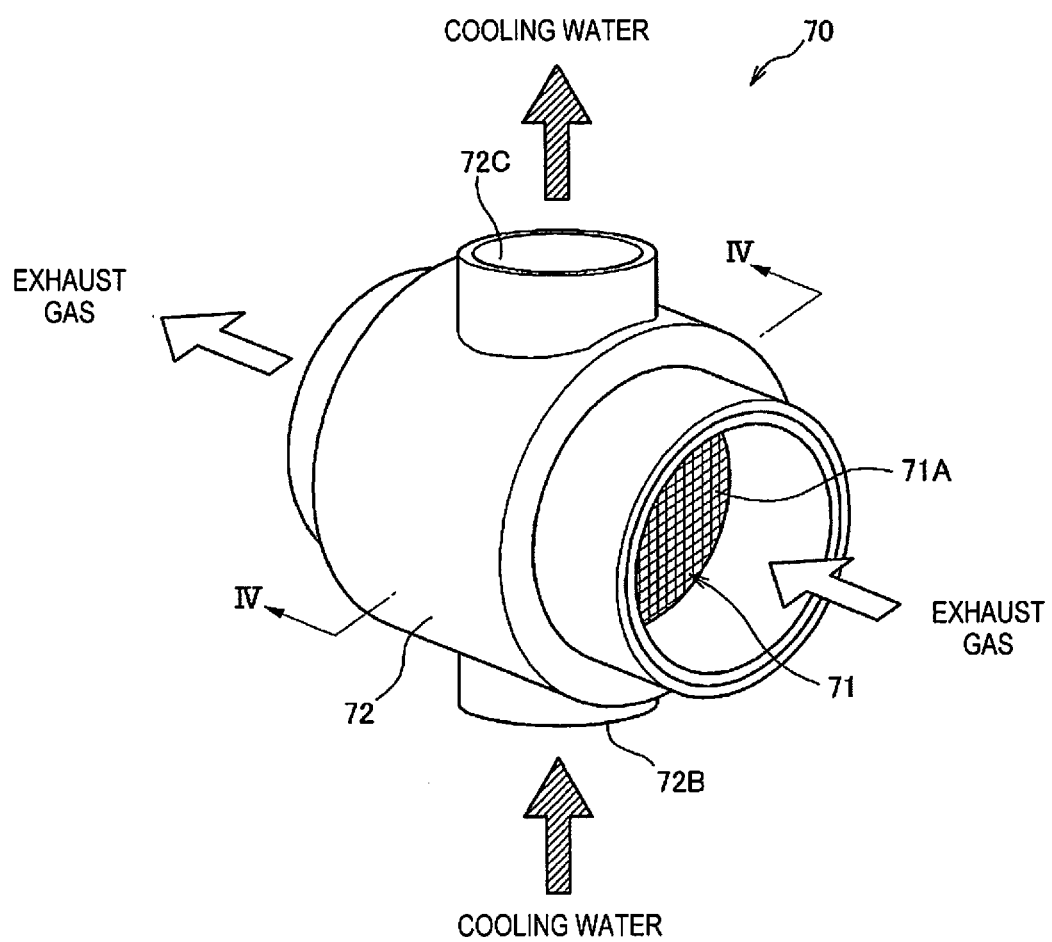
FIG. 3 is a perspective view of an exhaust heat recovery unit.

Now, with reference to FIGS. 3 and 4, description will be given of a configuration of the exhaust heat recovery unit 70. FIG. 3 is a perspective view of the exhaust heat recovery unit 70, FIG. 4 is a IV-IV cross-sectional view of the exhaust heat recovery unit 70 in FIG. 3.

Figure 4:
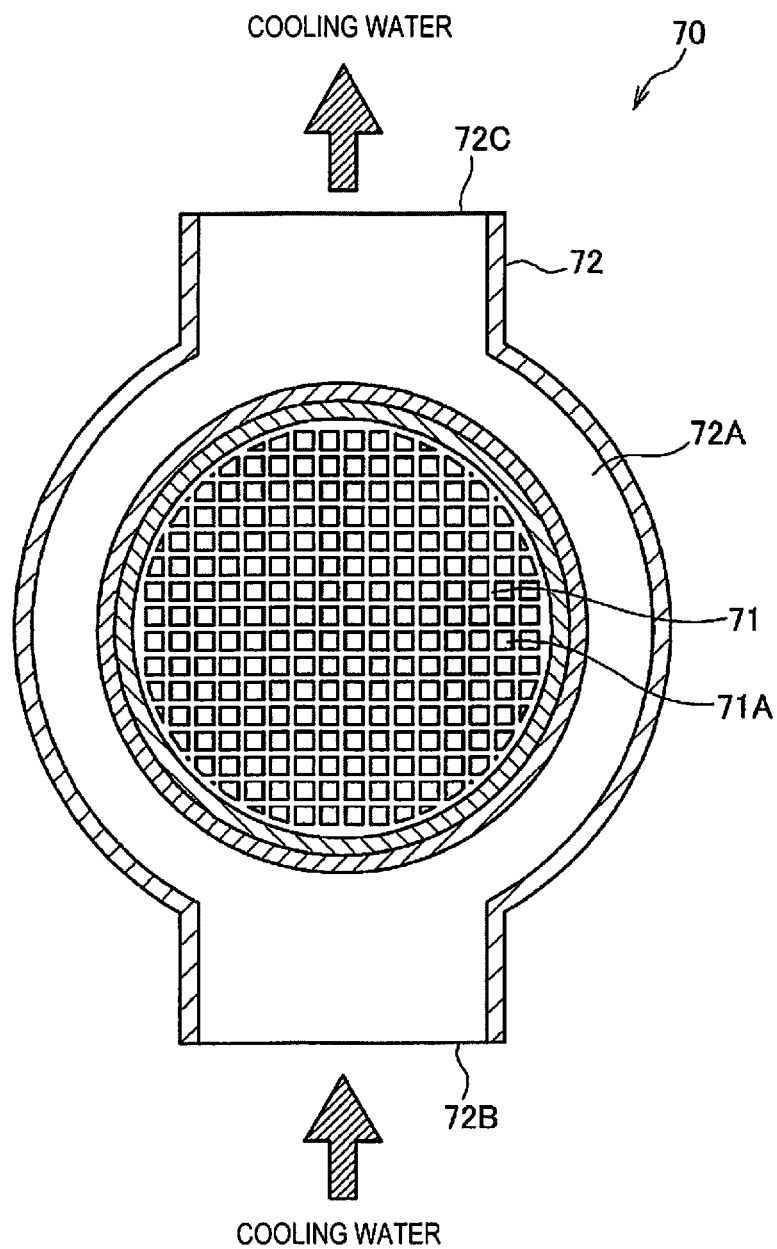
FIG. 4 is a IV-IV cross-sectional view of the exhaust heat recovery unit shown in FIG. 3.

As shown in FIGS. 3 and 4, the exhaust heat recovery unit 70 includes the exhaust heat recovery portion 71 for recovering exhaust heat, and the cooling unit 72 for cooling the exhaust heat recovery portion 71 via the cooling water.

The cooling section 72 is formed in a cylindrical member with the exhaust heat recovery portion 71 arranged inside the cooling section 72. The inner diameter of the cooling part 72 is formed slightly larger than the outer diameter of the exhaust heat recovery portion 71. The exhaust heat recovery portion 71 is fitted to the inner peripheral surface of the cooling portion 72.

The exhaust heat recovery portion 71 is formed of a material having a higher thermal conductivity, for example, silicon carbide (SiC) than the material forming the exhaust pipe 61 and exhaust manifold 62. The exhaust heat recovery portion 71 is a grid-like cylindrical member having a plurality of through-holes 71A in which the exhaust can pass. The through-hole 71A penetrates in the axial direction from one end face of the exhaust heat recovery portion 71 to the other end face. The exhaust heat recovery portion 71 may be configured as a honeycomb structure having the through-hole 71A shaped in a hexagonal cross-section. Note that the cross-sectional shape of the through-hole 71A is not limited to square or hexagonal, and may be formed in other shapes, such as circular, triangular, etc.

The exhaust heat recovery portion 71 is heated by exhaust gas passing through the through-hole 71A. The temperature of the exhaust gas will be lower after passing through the exhaust heat recovery portion 71 compared to the temperature of the exhaust gas before the exhaust passage.

The cooling unit 72 is provided in the exhaust pipe 61 in a state of accommodating the exhaust heat recovery portion 71. The inside of the cooling section 72 is configured as a part of the exhaust passage to flow exhaust.

The cooling unit 72 is provided with an annular passage 72A formed along the outer circumference of the exhaust heat recovery portion 71, an inlet port 72B for introducing the cooling water into the annular passage 72A, and a discharge port 72C for discharging the cooling water from the annular passage 72A. The inlet port 72B and the outlet port 72C are arranged offset by 180 degrees in the circumferential direction of the exhaust heat recovery portion 71.

The cooling water pumped by the water pump of the engine 1 (not shown) flows into the annular passage 72A of the exhaust heat recovery unit 70 through the inlet port 72B. The cooling water flows through the annular passage 72A to cool the exhaust heat recovery portion 71 from the outer peripheral side. The cooling water passing through the annular passage 72A is heated by the exhaust heat recovery portion 71, and is subsequently discharged from the exhaust heat recovery unit 70 through the discharge port 72C. The discharged cooling water is fed to the water jackets 16 and 22 in the cylinder block 10 and the cylinder head 20 as well as to the heating device (not shown) for use to warm-up the engine 1 and air-conditioning of a passenger compartment.

Figure 5:
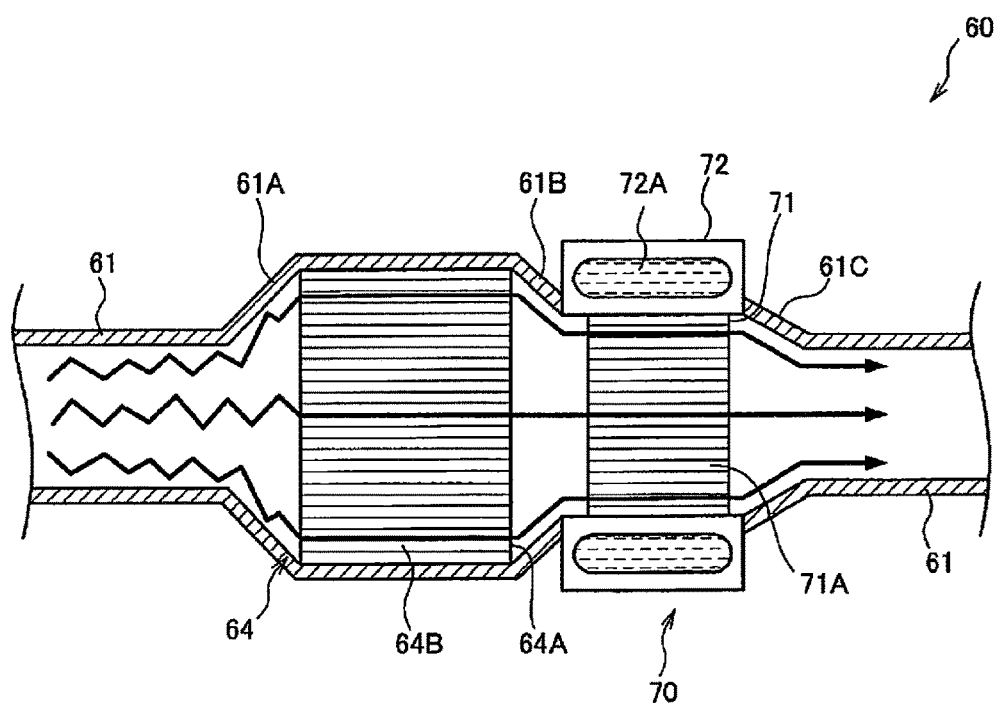
FIG. 5 is a cross-sectional view of the exhaust heat recovery unit near the exhaust apparatus.

Now, with reference to FIG. 5, a description will be given of a structure of the exhaust passage in the vicinity of the exhaust heat recovery unit 70. FIG. 5 is a cross-sectional view of the exhaust apparatus 60 near the exhaust heat recovery unit 70.

As shown in FIG. 5, the exhaust heat recovery unit 70 and the underfloor catalytic converter 64 are provided in an exhaust pipe 61 which constitutes part of the exhaust passage. The exhaust heat recovery portion 71 of the exhaust heat recovery unit 70 and an exhaust gas purification portion 64A of the underfloor catalytic converter 64 are of a cylindrical member and are disposed coaxially to each other.

The exhaust pipe 61 includes a diameter expanding or increasing portion 61A located on the upstream side of the exhaust purification portion 64A of the underfloor catalytic converter 64, a first diameter reducing portion 61B formed between the underfloor catalytic converter 64 and the exhaust gas recovery unit 70, and a second diameter reducing portion 61C located on the downstream side of the exhaust heat recovery unit 70.

The diameter increasing portion 61A of the exhaust pipe 61 is tapered and configured such that the passage diameter increases gradually from the upstream side toward the exhaust gas purification portion 64A.

The first diameter reducing portion 61B of the exhaust pipe 61 is a connecting passage (connecting portion) that connects the underfloor catalytic converter 64 and the exhaust heat recovery unit 70. The first diameter reducing portion 61B is tapered and is configured such that the passage diameter is gradually reduced in the direction from the underfloor catalytic converter 64 toward the exhaust heat recovery unit 70. Note that the exhaust pipe 61 between the diameter increasing portion 61A and the first diameter reducing portion 61B is formed as a flat passage with a constant passage diameter, and the exhaust gas purification portion 64A is provided on the flat passage.

The second diameter reducing portion 61C of the exhaust pipe 61 is a connecting passage that connects to the exhaust outlet of the exhaust heat recovery unit 70 (connection part). The second diameter reducing portion 61C are tapered, passage diameter from the exhaust heat recovery unit 70 toward the downstream is formed gradually so as to reduce.

The exhaust heat recovery unit 70 is disposed between the first diameter reducing portion 61B and the second diameter reducing portion 61C. The outer diameter of the exhaust heat recovery portion 71 of the exhaust heat recovery unit 70 is configured to be smaller than the outer diameter of the exhaust gas purification portion 64A, and is configured to be larger than the inner diameter oft the exhaust pipe 61 on the downstream side of the second diameter reducing portion 61C. Note that the inner diameter of the exhaust pipe 61 on the downstream side of the second diameter reducing portion 61 is configured to be the same as the inner diameter of the exhaust pipe 61 on the upstream side of the diameter increasing portion 61A. Also, the outer diameter of the exhaust gas purification portion 64A is configured to be larger than the inner diameter of the exhaust pipe 61 on the upstream side of the diameter increasing portion 61A.

As shown by an arrow in FIG. 5, the flow in front of the exhaust gas flowing into the exhaust gas purification portion 64A is relatively irregular. The exhaust gas flowing through upstream of the underfloor catalytic converter 64 is widened or expanded through the diameter increasing portion 61A and is introduced into the underfloor catalytic converter 64. The exhaust gas led to the underfloor catalytic converter 64 is rectified by passing through the through-hole 64B of the exhaust gas purification portion 64A, and a linear flow along the passage extending direction will be formed.

The exhaust gas is guided to the exhaust heat recovery unit 70, after the exhaust gas purification portion 64A passes through the first diameter reducing portion 61B. Therefore, the exhaust heat recovery portion 71 of the exhaust heat recovery unit 70 receives rectified exhaust gas in a relatively uniform flow by the exhaust gas purification portion 64A. However, since the exhaust gas flowing out from the through-holes 64B present near the outer periphery of the exhaust gas purification portion 64A is caused to be collected along the first diameter reducing portion 61B, the amount of exhaust gas flowing into the peripheral portion of the exhaust heat recovery portion 71 will be larger compared to the central portion. Thus, by increasing the amount of exhaust gas flowing into the peripheral portion of the exhaust heat recovery portion 71, the outer peripheral portion of the exhaust heat recovery portion 71 is easily heated. As a result, it is possible to increase the temperature of the outer peripheral portion of the exhaust heat recovery portion 71.

The cooling portion 72 of the exhaust heat recovery unit 70 includes a structure that removes heat from the outer peripheral side of the exhaust heat recovery portion 71. Therefore, by increasing the temperature of the outer peripheral portion of the exhaust heat recovery portion 71 as described above, it is possible to efficiently recover heat of the exhaust heat recovery portion 71 by the cooling unit 72.

The exhaust gas that has passed through the exhaust heat recovery unit 70 is collected toward the center of the exhaust pipe 61 through a second diameter reducing portion 61C, and is discharged to the outside through the exhaust pipe 61.

According to the exhaust apparatus 60 of the engine 1 in the first embodiment described above, it is possible to obtain the following effects.

In the exhaust apparatus 60 of the engine 1, an exhaust pipe 61 that constitutes the exhaust passage includes a first diameter reducing portion 61B which is gradually reduced in diameter toward the downstream between the underfloor catalytic converter 64 and the exhaust heat recovery unit 70, and a second diameter reducing portion 61C which is gradually reduced in diameter toward the downstream from the heat recovery unit 70. Since the exhaust gas rectified when passing through the exhaust gas purification portion 64A of the underfloor catalytic converter 64 is led to the exhaust heat recovery portion 71 of the exhaust heat recovery unit 70, the exhaust gas is likely to flow into the exhaust heat recovery portion 71 with ease. The exhaust gas flowing out from the through-holes 64B near the outer periphery of the exhaust gas purification portion 64A is collected along a first diameter reducing portion 61B. Thus, the temperature of the peripheral portion of the exhaust heat recovery portion 71 is further enhanced. Because the exhaust heat recovery unit 70 has a structure which extracts heat from the outer periphery of the exhaust heat recovery portion 71, by increasing the temperature of the outer peripheral portion of the exhaust heat recovery portion 71, it is possible to improve the exhaust heat recovery efficiency. Further, it is not necessary to provide a separate flow rectifier with the rectifying or straightening portion since the exhaust gas purification portion 64A of the underfloor catalytic converter 64 also functions as a rectifying portion. Therefore, it is possible to simplify the structure of the exhaust apparatus 60.

The exhaust pipe 61 is further provided with the diameter increasing portion 61A whose diameter increases gradually from the upstream side to the underfloor catalytic converter 64. The exhaust gas purification portion 64A of the underfloor catalytic converter 64 which adjusts the flow of exhaust is provided at a portion with a large inner diameter of passage between the diameter increasing portion 61A and the first diameter reducing portion 61B. Therefore, it is possible to place an exhaust gas purifying portion 64A of the large outer diameter. Therefore, it is possible to enhance the rectifying effect of the exhaust gas purification portion 64A.

The exhaust gas purification portion 64A of the underfloor catalytic converter 64 is formed as a cylindrical member having a plurality of through-holes 64B. The exhaust heat recovery portion 71 of the exhaust heat recovery unit 70 is also formed as a cylindrical member having a plurality of through-holes 71A. In addition, the outer diameter of the exhaust heat recovery portion 71 is configured to be smaller than the outer diameter of the exhaust gas purification portion 64A, and configured to be larger than the inner diameter of the exhaust pipe 61 downstream of the second diameter reducing portion 61C. With this configuration, it is possible to supply a relatively uniform exhaust gas to the entire entrance surface of the exhaust heat recovery portion 71. As a result, it is possible to improve the exhaust heat recovery efficiency by the exhaust heat recovery unit 70.

Note that, in the exhaust apparatus 60 of the engine 1, the exhaust gas purification portion 64A of the underfloor catalytic converter 64 is preferably configured as a honeycomb structure with the through-hole 64B shaped in a hexagonal cross-section. With such a configuration, it is possible to densely the arrangement of the through-holes 64B in the exhaust gas purification portion 64A. Thus, the rectifying function is improved. Therefore, it is possible to produce a more uniform discharge in the exhaust heat recovery unit 70.

Moreover, the exhaust heat recovery portion 71 of the exhaust heat recovery unit 70 also is preferably configured as a honeycomb structure with the through-hole 71A shaped in a hexagonal cross-section. With this configuration, it is possible to densely arrange the through-holes 71A in the exhaust heat recovery portion 71. Thus, the exhaust heat recovery function is improved. This configuration makes it possible to further improve the exhaust heat recovery efficiency at the exhaust heat recovery unit 70.

Furthermore, the opening area (passage diameter) of the through-hole 64B of the exhaust gas purification portion 64A is preferably configured to be smaller than that of the through-hole 71A of the heat recovery unit 71. In addition, the number of the through-holes 64B is preferably configured to be larger than that of the through-holes 71A. Thus, by setting the mesh or the rectifying hole of the exhaust gas purification portion 64A finer than the mesh of the exhaust heat recovery unit 71, it is possible to enhance the rectifying effect of the exhaust gas purification portion 64A. Thus, the exhaust passing through the exhaust gas purification portion 64A will be easily flown into the exhaust heat recovery portion 71. Therefore, it is possible to improve the exhaust heat recovery efficiency by the exhaust heat recovery unit 70.

Second Embodiment

Figure 6:
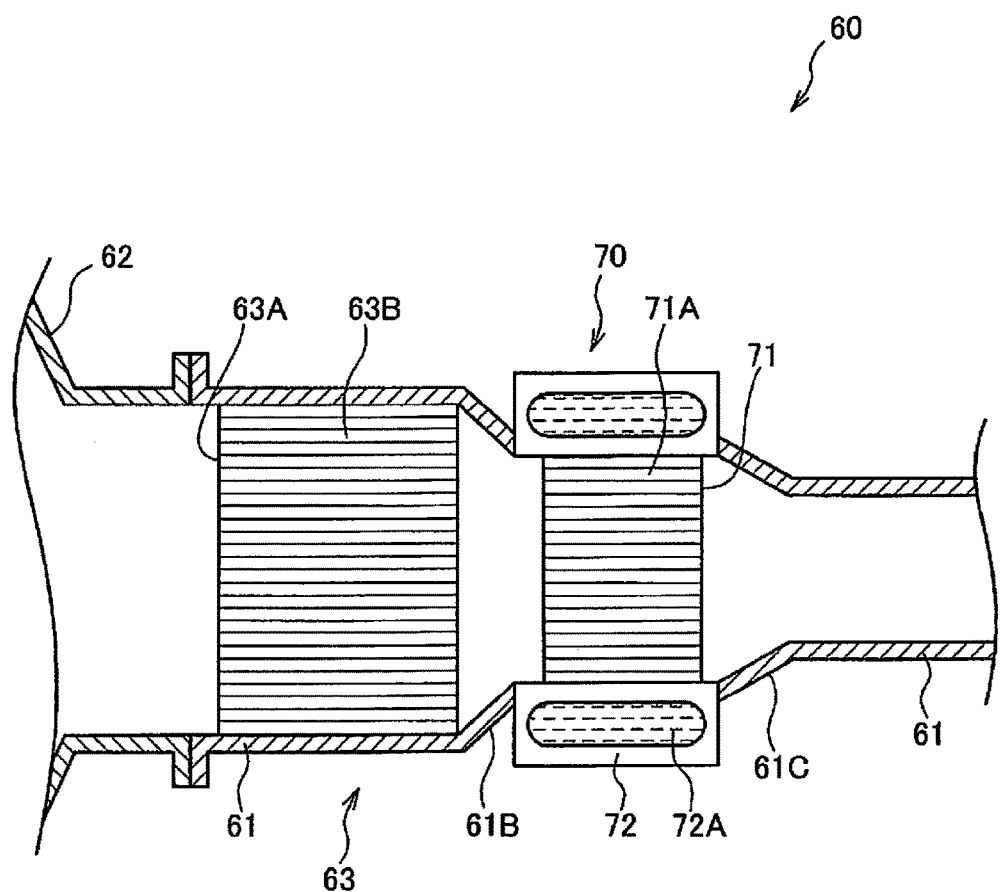
FIG. 6 is a sectional view showing the exhaust apparatus of the engine according to a second embodiment.

With reference to FIG. 6, a description is made of the exhaust apparatus 60 of the engine 1 according to the second embodiment according to the present invention.

The exhaust apparatus 60 of the engine 1 according to the second embodiment is different from the exhaust apparatus of the first embodiment in that the exhaust heat recovery unit 70 is located immediately after the manifold catalytic converter 63. In the following, the same reference numerals as the first embodiment are used for those configurations and the like that are equivalent to the first embodiment without redundant descriptions.

As shown in FIG. 6, the exhaust pipe 61 is connected to the downstream end of the exhaust manifold 62, and the manifold catalytic converter 63 is provided in the exhaust pipe 61. The configuration of the manifold catalytic converter 63 according to the present embodiment is the same as the manifold catalytic converter 63 according to the first embodiment. The inner diameter of the exhaust pipe 61 in which the manifold catalytic converter 63 is provided is configured to be substantially equal to the inner diameter of the junction pipe formed downstream of the exhaust manifold 62.

In the present embodiment, the exhaust heat recovery unit 70 is installed, rather than downstream of the underfloor catalytic converter 64, downstream of the exhaust pipe 61 of the manifold catalytic converter 63.

The exhaust pipe 61 includes a first diameter reducing portion 61B which is formed between the manifold catalytic converter 63 and the exhaust heat recovery unit 70, and a second diameter reducing portion 61C formed on the downstream side of the exhaust heat recovery unit 70.

The first diameter reducing portion 61B of the exhaust pipe 61 is a connecting passage (connecting portion) that connects the manifold catalytic converter 63 and the exhaust heat recovery unit 70. The first diameter reducing portion 61B is tapered, and is configured such that the passage diameter is gradually reduced in the direction from the manifold catalytic converter 63 to the exhaust heat recovery unit 70.

The second diameter reducing portion 61C of the exhaust pipe 61 is a connecting passage (connection portion) that is connected to the exhaust outlet of the exhaust heat recovery unit 70. The second diameter reducing portion 61C is tapered, and is configured such that the passage diameter is gradually reduced from the exhaust heat recovery unit 70 toward the downstream. Note that on the downstream side of the exhaust pipe 61 of the second diameter reducing portion 61C, an underfloor catalytic converter 64 is provided (not shown in FIG. 6).

The outer diameter of the exhaust heat recovery portion 71 of the exhaust heat recovery unit 70 is configured to be smaller than the outer diameter of the exhaust gas purification unit 63A, and larger than the inner diameter of the exhaust pipe 61 downstream of the second diameter reducing portion 61C.

In the exhaust apparatus 60 of the engine 1 according to the second embodiment, the exhaust gas is rectified by passing through the through-holes 63B of the exhaust gas purification unit 63A of the manifold catalytic converter 63 and introduced in the exhaust heat recovery portion 71 of the exhaust heat recovery unit 70. Therefore, the exhaust gas is likely to flow into the exhaust heat recovery portion 71 with ease. Since the exhaust gas flowing out from the through-holes 63B present near the outer periphery of the exhaust gas purification unit 63A is caused to be collected along a first diameter reducing portion 61B, the temperature of the peripheral portion of the exhaust heat recovery portion 71 is further enhanced. Because the exhaust heat recovery unit 70 includes a structure that removes heat from the outer peripheral side of the exhaust heat recovery portion 71, by increasing the temperature of the outer peripheral portion of the exhaust heat recovery portion 71, it is possible to improve the exhaust heat recovery efficiency.

Note that, in the exhaust apparatus 60 of the engine 1, the exhaust gas purification unit 63A of a manifold catalytic converter 63 is preferably configured as a honeycomb structure with the through-hole 63B shaped in hexagonal cross-section. With such a configuration, it is possible to densely arrange the through-holes 63B in the exhaust gas purification unit 63A. Thus, the rectifying function is improved.

Moreover, the exhaust heat recovery portion 71 of the exhaust heat recovery unit 70 also is preferably configured as a honeycomb structure with the through-hole 71A shaped in a hexagonal cross-section. With this configuration, it is possible to densely arrange the through-holes 71A in the exhaust heat recovery portion 71. Thus, the exhaust heat recovery function is improved.

Furthermore, the opening area (passage diameter) of the through-hole 63B of the exhaust gas purification unit 63A is preferably set smaller than the through-hole 71A of the heat recovery unit 71, and the number of the through-holes 63B is preferably set larger than the through-hole 71A. Thus, by setting the mesh of the exhaust gas purification portion 63A finer that of the exhaust heat recovery unit 71, it is possible to enhance the rectifying effect of the exhaust gas purification portion 63A.

The present invention is not limited to the above embodiments. It is obvious that various modifications can be made within the scope of the technical spirit thereof.

In the above embodiment, the exhaust gas purification units 63A, 64A of the catalytic converter, are configures as a rectifying portion. However, in the exhaust device 60, on the upstream side of the exhaust heat recovery unit 70, a rectifying portion having only exhaust rectifying function without exhaust purification function may be disposed.

As described above, a description is given of the embodiments according to the present invention. However, the above embodiments merely show some applications of the present invention, and the technical scope of the present invention is not intended to be limited to the specific configurations of the above embodiment.

The invention claimed is:
1. An engine exhaust apparatus comprising:
an exhaust passage configured to receive exhaust gas emitted from an engine, the exhaust passage having a first diameter reducing portion and a second diameter reducing portion;
a flow rectifier having a rectifying portion configured to rectify flow of the exhaust gas in the exhaust passage;
an exhaust heat recovery unit disposed in the exhaust passage downstream of the flow rectifier, the exhaust heat recovery unit including an exhaust heat recovery portion configured to recover heat of the exhaust gas and a cooling portion configured to cool the exhaust heat recovery portion from an outer peripheral side using cooling fluid, the first diameter reducing portion having a gradually reducing diameter in a direction toward the exhaust heat recovery unit from the flow rectifier, a downstream end of the first diameter reducing portion being separated from the exhaust heat recovery unit by a first outer diameter, and the second diameter reducing portion having a gradually reducing diameter toward a direction downstream of the exhaust heat recovery unit, an upstream end of the second diameter reducing portion and the exhaust heat recovery unit being separated by a second outer diameter that is equal to the first outer diameter.

2. The engine exhaust apparatus according to claim 1, wherein
the rectifying portion is configured as a cylindrical member having a plurality of through-holes configured to allow passage of the exhaust gas, the exhaust heat recovery unit being a cylindrical member having a plurality of rectifying holes configured to allow passage of the exhaust gas, and an outer diameter of the exhaust heat recovery portion being smaller than an outer diameter of the flow rectifier and larger than an inner diameter of the exhaust passage at a location downstream of the second diameter reducing portion.

3. The engine exhaust apparatus according to claim 2, wherein
the exhaust passage further includes a diameter increasing portion having a gradually increasing diameter in a direction toward the flow rectifier from an upstream side of the flow rectifier.

4. The engine exhaust apparatus according to claim 2, wherein
an opening area of a rectifying hole of the plurality of rectifying holes is smaller than an opening area of a through-hole of the plurality of through-holes, and a maximum number of the rectifying holes being greater than a maximum number of the through-holes.

5. The engine exhaust apparatus according to claim 2, wherein
the flow rectifier has a honeycomb structure with the flow rectifying holes each having a hexagonal cross-section.

6. The engine exhaust apparatus according to claim 2, wherein
the exhaust heat recovery portion has a honeycomb structure with each of the through-holes having a hexagonal cross-section.

7. The engine exhaust apparatus according to claim 1, wherein
the flow rectifier is a catalytic converter having an exhaust gas purifying portion as the rectifying portion, the exhaust gas purifying portion further being configured to purify the exhaust gas.

8. The engine exhaust apparatus according to claim 3, wherein
an opening area of a rectifying hole of the plurality of rectifying holes is smaller than an opening area of a through-hole of the plurality of through-holes, and a maximum number of the rectifying holes being greater than a maximum number of the through-holes.

9. The engine exhaust apparatus according to claim 3, wherein
the flow rectifier has a honeycomb structure with the flow rectifying holes each having a hexagonal cross-section.

10. The engine exhaust apparatus according to claim 4, wherein
the flow rectifier has a honeycomb structure with the flow rectifying holes each having a hexagonal cross-section.

11. The engine exhaust apparatus according to claim 3, wherein
the exhaust heat recovery portion has a honeycomb structure with each of the through-holes having a hexagonal cross-section.

12. The engine exhaust apparatus according to claim 4, wherein
the exhaust heat recovery portion has a honeycomb structure with each of the through-holes having a hexagonal cross-section.

13. The engine exhaust apparatus according to claim 5, wherein
the exhaust heat recovery portion has a honeycomb structure with each of the through-holes having a hexagonal cross-section.

14. The engine exhaust apparatus according to claim 2, wherein
the flow rectifier is a catalytic converter having an exhaust gas purifying portion as the rectifying portion, the exhaust gas purifying portion further being configured to purify the exhaust gas.

15. The engine exhaust apparatus according to claim 3, wherein
the flow rectifier is a catalytic converter having an exhaust gas purifying portion as the rectifying portion, the exhaust gas purifying portion further being configured to purify the exhaust gas.

16. The engine exhaust apparatus according to claim 4, wherein
the flow rectifier is a catalytic converter having an exhaust gas purifying portion as the rectifying portion, the exhaust gas purifying portion further being configured to purify the exhaust gas.

17. The engine exhaust apparatus according to claim 5, wherein
the flow rectifier is a catalytic converter having an exhaust gas purifying portion as the rectifying portion, the exhaust gas purifying portion further being configured to purify the exhaust gas.

18. The engine exhaust apparatus according to claim 6, wherein
the flow rectifier is a catalytic converter having an exhaust gas purifying portion as the rectifying portion, the exhaust gas purifying portion further being configured to purify the exhaust gas.

\* \* \* \* \*